[11] 3,620,601

| | | | | |
|---|---|---|---|---|
| [72] | Inventors | Leonard Cyril Waghorn Stoneleigh; Peter Raymond Turner, Woldingham, both of England | 3,503,146 | 3/1970 Woplin 350/174 UX |
| | | | 3,511,465 | 5/1970 Morion 248/479 |

[72] Inventors Leonard Cyril Waghorn
 Stoneleigh;
 Peter Raymond Turner, Woldingham, both
 of England
[21] Appl. No. 83,374
[22] Filed Oct. 23, 1970
[45] Patented Nov. 16, 1971
[73] Assignee Smiths Industries Limited
 London, England
 by said Waghorn
[32] Priority Oct. 24, 1969
[33] Great Britain
[31] 52,164/69

[54] HEAD-UP DISPLAY APPARATUS
 8 Claims, 1 Drawing Fig.
[52] U.S. Cl. ............................. 350/174,
 178/7.88, 248/479 250/221, 356/51
[51] Int. Cl. ............................. G02b 27/14
[50] Field of Search ......................... 350/174,
 169; 178/7.88, 7.89; 356/251, 252; 250/221, 222;
 248/479

[56] References Cited
 UNITED STATES PATENTS
 2,058,668 10/1936 Davis ....................... 250/221 X
 3,503,146 3/1970 Woplin 350/174 UX
 3,511,465 5/1970 Morion 248/479

Primary Examiner—David Schonberg
Assistant Examiner—John W. Leonard
Attorneys—William D. Hall, Elliott I. Pollock, Fred C. Philpitt, George Vande Sande, Charles F. Steininger and Robert R. Priddy ABSTRACT: A head-up display apparatus for a craft comprises means for projecting a display of information and a partially transparent reflector associated with the display projection means. The reflector has either an operative position in which the projected display is reflected by the reflector to appear in an observer's line of sight through the reflector or a retracted position out of the observer's line of sight. The apparatus also includes means for displacing the reflector from the operative position to the retracted position, and means sensitive to radiant energy, the reflector displacement means being controlled in accordance with the radiant energy sensed by the radiation-sensitive means to effect the displacement of the reflector in response to change in radiation sensed by the radiation-sensitive means.

PATENTED NOV 16 1971
3,620,601
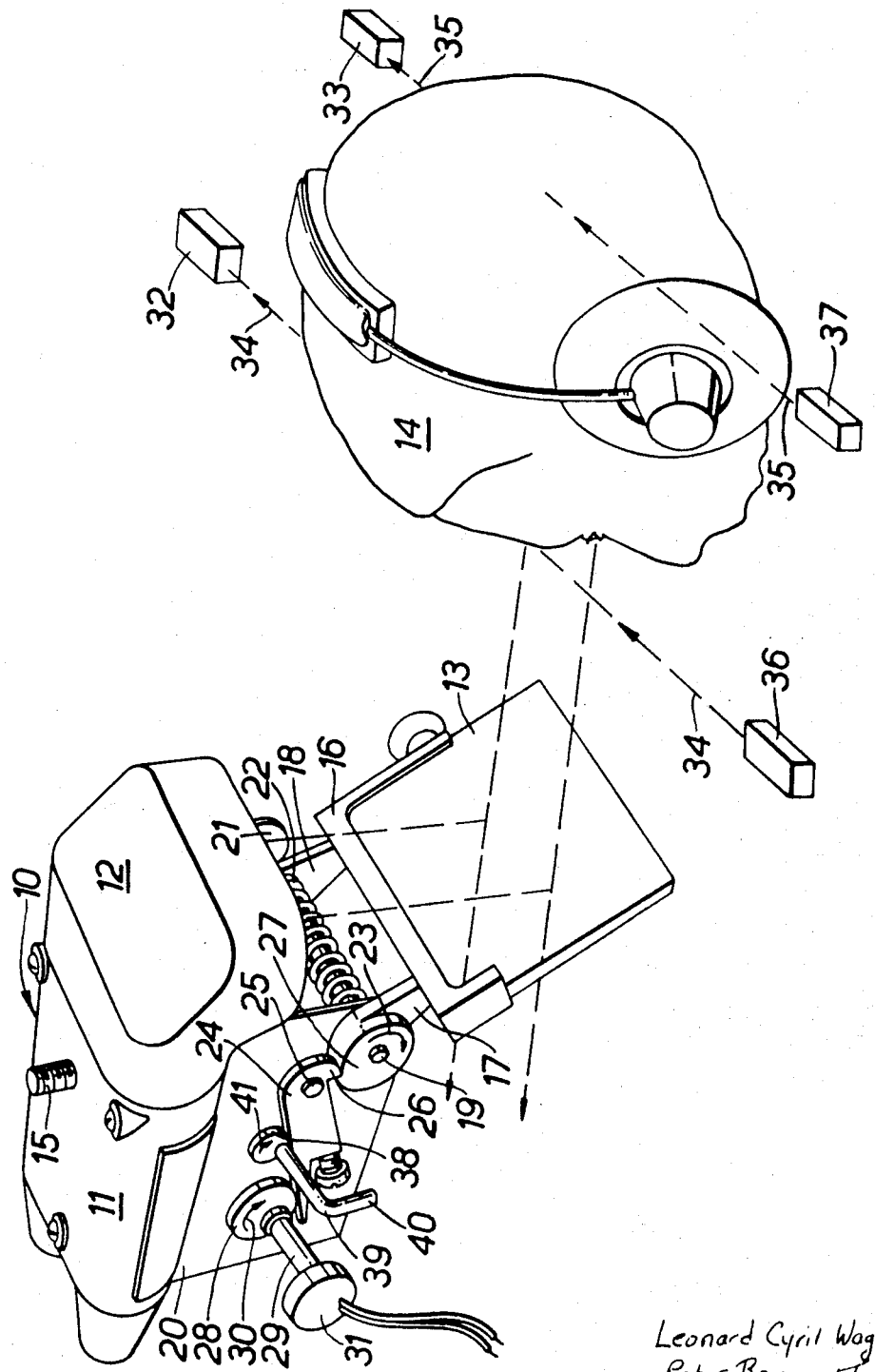
Leonard Cyril Waghorn
Peter Raymond Turner
Inventors
by Hall, Pollock & Vande Sande
Attorneys

HEAD-UP DISPLAY APPARATUS

This invention relates to head-up display apparatus.

According to the present invention there is provided a head-up display apparatus for a craft, wherein a partially transparent reflector is associated with an arrangement for projecting a display of information and is mounted to have an operative position in which the projected display is reflected thereby to appear in an observer's line of sight through the reflector, and wherein the apparatus includes means sensitive to radiated energy, and means for displacing the reflector from its operative position to a retracted position out of the observer's line of sight, in response to change in radiation sensed by the radiation-sensitive means.

The apparatus may include means for radiating energy, and, in such a case, the radiation-sensitive means and the radiating means may be arranged such as to provide said change in response to movement of the observer's head towards said reflector.

The radiating means may be arranged to provide a plurality of beams of radiation, the beams being spaced apart in the direction of said movement of the observer's head such that at least one of them is interrupted by the observer's head during said movement.

The radiation-sensitive means may comprise first and second devices for sensing said radiant energy, and, in such a case, said reflector displacement means may be arranged to effect said displacement in response to a condition, arising from said movement of the observer's head towards the reflector, in which there is a decrease in the amount of radiation received by said first device and an increase in the amount of radiation received by said second device.

One form of head-up display apparatus for an aircraft according to the present invention will now be described, by way of example, with reference to the accompanying drawing which shows diagrammatically a perspective view of the head-up display apparatus.

The head-up display apparatus comprises a housing 10 having a first part 11 which houses a cathode-ray tube and a second part 12 which houses a collimator that projects the display appearing on the screen of the cathode-ray tube on to an inclined partially transparent reflector 13. The reflector 13 is disposed in the line of sight of the pilot 14 through the windscreen of the aircraft. The pilot 14 accordingly views the collimated image of the display provided by the cathode-ray tube against a background of the scene through the windscreen, and does so without any need for refocussing of his eyes. The first part 11 of the housing 10 carries a screw 15 to enable the housing 10 to be secured to the ceiling of the aircraft cockpit.

The reflector 13 is usually disposed some 9 to 12 inches or less, from the normal position of the pilot's head and it is possible, therefore, that movement of the pilot may result in the pilot's head striking the reflector 13. In order to prevent this the head-up display apparatus is provided with means for automatically displacing the reflector 13 from its operative position in the line of sight of the pilot 14 to a retracted position whenever movement of the pilot's head would otherwise result in the pilot 14 striking his head against the reflector 13.

The reflector 13 is carried by a support 16 having a pair of arms 17 and 18 that are mounted on respective ends of a spindle 19. The spindle 19 is carried by a pair of plates 20 and 21 that extend downwardly from the housing 10, the spindle 19 extending through holes (not shown) in the plates 20 and 21 that constitute bearings for the spindle 19.

The spindle 19 carries a spring 22 that is mounted to urge the reflector 13 and the support 16 in a clockwise direction, as indicated by an arrow 23, from the operative position shown in the drawing to the retracted position. The action of the spring 22 is restrained by a lever 24 that is carried by a pivot 25 mounted on the plate 20. The lever 24 carries a pawl 26 that engages a step formed in the peripheral edge of a generally disk-shaped portion 27 carried by the arm 17. The lever 24 is spring loaded to maintain the pawl 26 in engagement with the step in the peripheral edge of the portion 27.

When it is required to displace the reflector 13 from the operative position to the retracted position, the end of the lever 24 remote from the pawl 26 is forced downwardly to disengage the pawl 26 from the step in the peripheral edge of the portion 27 and thereby release the spring 22. This is accomplished by a cam 28 whose peripheral edge engages the lever 24. The cam 28 is carried by a spindle 29 that is journaled in the plate 20 and is rotatable in the direction of an arrow 30 by a rotary solenoid 31 mounted on the free end of the spindle 29.

The operation of the rotary solenoid 31 is controlled by signals derived from infrared sensors 32 and 33 that sense respective beams 34 and 35 of infrared radiation supplied by infrared sources 36 and 37 respectively. The sources 36 and 37 are mounted on the side of the cockpit while the sensors 32 and 33 are mounted on the ceiling of the cockpit, the sources 36 and 37 and the sensors 32 and 33 being disposed so that when the pilot's head is in its normal position, that is the position shown in the drawing, the beam 35 is interrupted by the pilot's head and the beam 34 passes some 3 inches in front of the pilot's head. The sensors 32 and 33 provide output signals representative of whether they have received infrared radiation.

The rotary solenoid 31 is arranged to rotate the cam 28 in the direction of the arrow 30 only when it receives signals from the sensors 32 and 33 which indicate that the sensor 33 is receiving infrared radiation and that no such radiation is being received by the sensor 32. Thus, the cam 28 is rotated to allow the spring 22 to displace the reflector 13 whenever the pilot's head moves to a position where it interrupts only the beam 34. Although in the arrangement described two infrared beams 34 and 35 are provided to sense movement of the pilot's head towards the reflector 13, it is visualized that a single infrared beam only may be used for this purpose. The beam could be disposed in the position of the beam 34 or the beam 35 or be disposed in some other appropriate position between the normal position of the pilot's head and the reflector 13.

While such an arrangement prevents the pilot's head striking the reflector 13 it is preferred to employ the two infrared beams 34 and 35 since there is then less likelihood of the reflector 13 being accidentally displaced from the operative position. For example, in the arrangement described previously, the reflector 13 will not be displaced from the operative position if either a hand of the pilot 14 interrupts the beam 34 or sideways movement of the pilot's head from its normal position results in the beam 35 becoming continuous.

A cam 38 whose peripheral edge engages the lever 24 is provided to enable the reflector 13 to be retracted manually. The cam 38 is carried by a spindle 39 that is journaled in the plate 20. The spindle 39 is bent at its free end to form a handle 40 to enable the cam 38 to be readily rotated by the pilot 14 in the direction of an arrow 41 to release the spring 22 and thereby enable it to retract the reflector 13. The support 16 carries a handle 42 to enable the pilot 14 to move the reflector 13 from the retracted position to the operative position.

The movement of the pilot's head that is likely to result in the pilot 14 striking his head against the reflector 13 may arise from rapid deceleration of the aircraft. The head-up display apparatus may, therefore, include, as a safety measure, a deceleration-sensitive switch (not shown) that is arranged to operate the lever 24 to allow displacement of the reflector 13 whenever the deceleration attains a magnitude that is likely to cause the pilot's head to strike the reflector 13.

We claim:

1. A head-up display apparatus for a craft, comprising a partially transparent reflector associated with means for projecting a display of information and mounted to have an operative position in which the projected display is reflected thereby to appear in the observer's line of sight through the reflector, said apparatus including means for radiating energy, means sensitive to said radiated energy, said radiation-sensitive means and said radiating means being mounted to provide a change in radiation sensed by the radiation-sensitive means in response to movement of the observer's head toward the reflector, and means for displacing the reflector from its operative position out of the observer's line of sight said reflector displacement means including means for initiating said displacement in response to said change in radiation sensed by the radiation-sensitive means.

2. An apparatus according to claim 1, wherein said radiating means comprises means for providing a plurality of beams of radiation along respective paths spaced apart in the direction of said movement, and wherein the radiation-sensitive means comprises means for sensing each of said radiation beams, at least one of said paths being traversable by the observer's head during said movement.

3. An apparatus according to claim 2, wherein the radiating means comprises individual devices for supplying said radiation beams and the radiation-sensitive means comprises individual devices for sensing said radiation beams.

4. An apparatus according to claim 2, wherein said radiation beams are substantially parallel with one another.

5. An apparatus according to claim 1, wherein the radiation-sensitive means comprises a first device mounted to receive a decreasing amount of said radiation during said movement, and a second device mounted to receive an increasing amount of said radiation during said movement, said means for initiating said displacement comprising means for responding to a condition in which there is an increase in the amount of radiation received by the second device and a decrease in the amount of radiation received by the first device.

6. An apparatus according to claim 1, including means for sensing deceleration of the craft, and wherein said reflector displacement means includes means for initiating said displacement in response to a condition in which the deceleration sensed by said deceleration sensing means attains a predetermined value.

7. An apparatus according to claim 1, wherein said reflector displacement means comprises resilient means for urging said displacement of the reflector, control means for controlling the resilient means having a first condition for inhibiting operation of the resilient means to effect said displacement of the reflector and having a second condition for releasing the resilient means to effect said displacement, and means for switching said control means from said first condition to said second condition in response to said change in radiation.

8. An apparatus according to claim 1, wherein said reflector displacement means includes manually operable means for initiating said displacement.

* * * * *